United States Patent
Tan et al.

(10) Patent No.: US 12,105,070 B2
(45) Date of Patent: Oct. 1, 2024

(54) LC-MS/MS METHOD FOR MEASUREMENT OF ALOESIN IN RAT PLASMA

(71) Applicant: HAINAN MEDICAL UNIVERSITY, Hainan (CN)

(72) Inventors: Yinfeng Tan, Hainan (CN); Hailong Li, Hainan (CN); Youbin Li, Hainan (CN); Xuesong Wang, Hainan (CN); Xue Cui, Hainan (CN)

(73) Assignee: HAINAN MEDICAL UNIVERSITY, Haikou (CN)

( * ) Notice: Subject to any disclaimer, the term of this patent is extended or adjusted under 35 U.S.C. 154(b) by 639 days.

(21) Appl. No.: 17/421,646

(22) PCT Filed: Mar. 12, 2021

(86) PCT No.: PCT/CN2021/080459
§ 371 (c)(1),
(2) Date: Jul. 8, 2021

(87) PCT Pub. No.: WO2022/110569
PCT Pub. Date: Jun. 2, 2022

(65) Prior Publication Data
US 2023/0138381 A1    May 4, 2023

(30) Foreign Application Priority Data

Nov. 27, 2020 (CN) .......................... 202011358890.5

(51) Int. Cl.
*G01N 30/88* (2006.01)
*G01N 30/06* (2006.01)

(52) U.S. Cl.
CPC ............. *G01N 30/88* (2013.01); *G01N 30/06* (2013.01)

(58) Field of Classification Search
CPC .... G01N 30/88; G01N 30/06; G01N 30/7233; G01N 30/34; H01J 49/30; H01J 49/165; H01J 49/0009; H01J 49/168; H01J 49/027

See application file for complete search history.

(56) References Cited

FOREIGN PATENT DOCUMENTS

| CN | 106093227 A | * | 11/2016 | |
| CN | 108508107 A | * | 9/2018 | ............. G01N 30/02 |

* cited by examiner

*Primary Examiner* — David E Smith
*Assistant Examiner* — Hsien C Tsai
(74) *Attorney, Agent, or Firm* — NIXON & VANDERHYE

(57) ABSTRACT

A method for measuring aloesin in rat plasma includes: taking the to-be-detected plasma containing aloesin, adding the methanol solution containing the internal standard compound aloeresin D thereinto, performing vortex precipitation, centrifuging, and collecting supernatant as to-be-detected sample; setting liquid chromatogram conditions as follows: carrying out gradient elution by adopting a mobile phase A and a mobile phase B, wherein the mobile phase A is an aqueous solution containing 0.1-1.0 thousandth (v/v) of formic acid, the mobile phase B is methanol; Setting mass spectrometry conditions as follows: using electrospray ion source, using negative ion detection, spray voltage being 4500 V, spray temperature being 550° C.; adopting multiple reaction ion monitoring scan mode, wherein the ion pair used for the quantitative analysis of aloesin is m/z 393.1→272.9, and the ion pair for the internal standard compound aloeresin D is m/z 555.3→144.9. The method improves aloesin detection in plasma.

10 Claims, 2 Drawing Sheets

LC-MS/MS METHOD FOR MEASUREMENT OF ALOESIN IN RAT PLASMA

CROSS-REFERENCE TO RELATED APPLICATIONS

This application is the U.S. national phase of International Application No. PCT/CN2021/080459 filed Mar. 12, 2021, which designated the U.S. and claims priority to Chinese Application No. 202011358890.5 filed Feb. 26, 2021, the entire contents of each of which are hereby incorporated by reference.

FIELD OF THE INVENTION

The invention relates to the technical field of aloesin, in particular to a LC-MS/MS method for measurement of aloesin in rat plasma.

BACKGROUND OF THE INVENTION

Aloe is a kind of chromone glycosides, which are found in many plants of the genus Aloe in the Liliaceae family. The content in Aloe barbadensis Miller is about 3‰. Aloe vera is a traditional Chinese medicine with a long history of use. The juice of its leaves is concentrated and dried and used as medicine. It has the effects of diarrhea and catharsis, clearing the liver and purging fire, and destroying parasites for curing malnutrition. Relevant studies have shown that aloesin is one of the important active substances in aloe. Aloesin can inhibit the activity of tyrosinase, prevent the synthesis of melanin, and has a whitening effect. Aloesin can regulate the release of cellular inflammatory factors and growth factors, produce anti-inflammatory effects; induce the activation of Smad and MAPK signal proteins, and promote wound healing. Aloesin can also activate the WNT signaling pathway, down-regulate the Nortch signaling pathway, regulate the function of the digestive system, and improve the pathological state of colitis rats.

Aloe extract containing aloesin can promote the secretion of adiponectin, regulate the glucolipid metabolism of experimental animals, and have anti-diabetic effects. Toxicological studies have shown that aloesin has basically no toxic side effects. However, there are few studies on the pharmacodynamics of aloesin, relevant reports did not provide pharmacokinetic parameters, and the analytical techniques used are relatively backward. The present invention seeks to establish a more rapid and sensitive analysis method of aloesin and apply it to pharmacokinetic research.

BRIEF SUMMARY OF THE INVENTION

In view of this, the present invention proposes a LC-MS/MS method for measurement of aloesin in rat plasma, which can detect aloesin in plasma more quickly, sensitively and accurately, and can be better applied to pharmacokinetic research.

The technical solution of the present invention is realized as follows:

A LC-MS/MS method for measurement of aloesin in rat plasma, characterized in that it comprises the following steps:
(1) plasma sample processing: taking the to-be-detected plasma containing aloesin, adding the methanol solution containing the internal standard compound aloeresin D thereinto, performing vortex precipitation, centrifuging, and collecting supernatant as to-be-detected sample;
(2) setting the conditions of the liquid chromatogram as follows: carrying out gradient elution by adopting a mobile phase A and a mobile phase B, wherein the mobile phase A is an aqueous solution containing 0.1-1.0‰ (v/v) formic acid, the mobile phase B is methanol, and the gradient elution procedure is as follows:

| Time/min | mobile phase A/% | mobile phase B/% |
|---|---|---|
| 0~0.50 | 95 | 5 |
| 0.51~3.00 | 95~5 | 5~95 |
| 3.01~4.00 | 10 | 90 |
| 4.01~5.00 | 95 | 5 |

(3) Setting the mass spectrometry conditions as follows: using electrospray ion source, using negative ion detection, spray voltage being 4500V, spray temperature being 550° C.; adopting multiple reaction ion monitoring scan mode, wherein the ion pair used for the quantitative analysis of aloesin is m/z 393.1→272.9, and the ion pair for the internal standard compound aloeresin D is m/z 555.3→144.9.

Further, in the step (1), the methanol solution containing the internal standard compound aloeresin D is mixed with the plasma in a volume ratio of 2-4:1.

Further, in the step (1), the concentration of the methanol solution containing the internal standard compound aloeresin D is 50 ng/mL~100 ng/mL.

Further, in the step (1), the rotation speed of the vortex is 2000 rpm and the time thereof is 10 min; and the conditions of the centrifugation: with 13000 rpm and 4° C., centrifuging for 10 min.

Further, in the step (2), a chromatographic column with a filler of C18 is used, and is chosen from one of the following: a Synergi Hydro-Rp C18 chromatographic column, a Luna Omega C18 chromatographic column, and a Kinetex Evo C18 chromatographic column; the specification of the chromatographic column being 2.10 mm×50 mm, and the particle size of the filler being 2-5 μm.

Further, the chromatographic conditions are as follows: column temperature being 28~40° C., injection volume being 1~10 μL, flow rate being 0.40~0.60 mL·min$^{-1}$.

Further, the mass spectrometry conditions are as follows: GS1 being 30-100 psi, GS2 being 30-100 psi, and curtain gas being 20-50 psi, collision gas being 1-8 psi.

Further, the parameters of the multiple reaction ion monitoring scan mode are:

| | DP/V | CE/V | CXP/V | EP/V |
|---|---|---|---|---|
| aloesin | 90 | 29 | 10 | 10 |
| aloeresin D | 115 | 41 | 11 | 10 |

Wherein, DP: Declustering Potential; CE: Collision Energy; CXP: collision cell exit potential; EP: entrance potential;

Further, the column temperature is 30° C., the injection volume is 5 μL, and the flow rate is 0.50 mL·min$^{-1}$.

Further, the mass spectrometry conditions are as follows: GS1 being 50 psi, GS2 being 50 psi, curtain gas being 30 psi, collision gas being 2 psi.

Compared with the prior art, the present invention has the following beneficial effects: the present invention develops a LC-MS/MS method for the measurement of aloesin in rat plasma, which adopts a combination of liquid chromatography-mass spectrometry/mass spectrometer, sets a specific gradient elution procedure, combines with certain mass spectrometry conditions, can quickly, sensitively and accurately detect aloesin in plasma, and can be better applied to pharmacokinetic research.

DETAILED DESCRIPTION OF THE INVENTION

Figure 1:
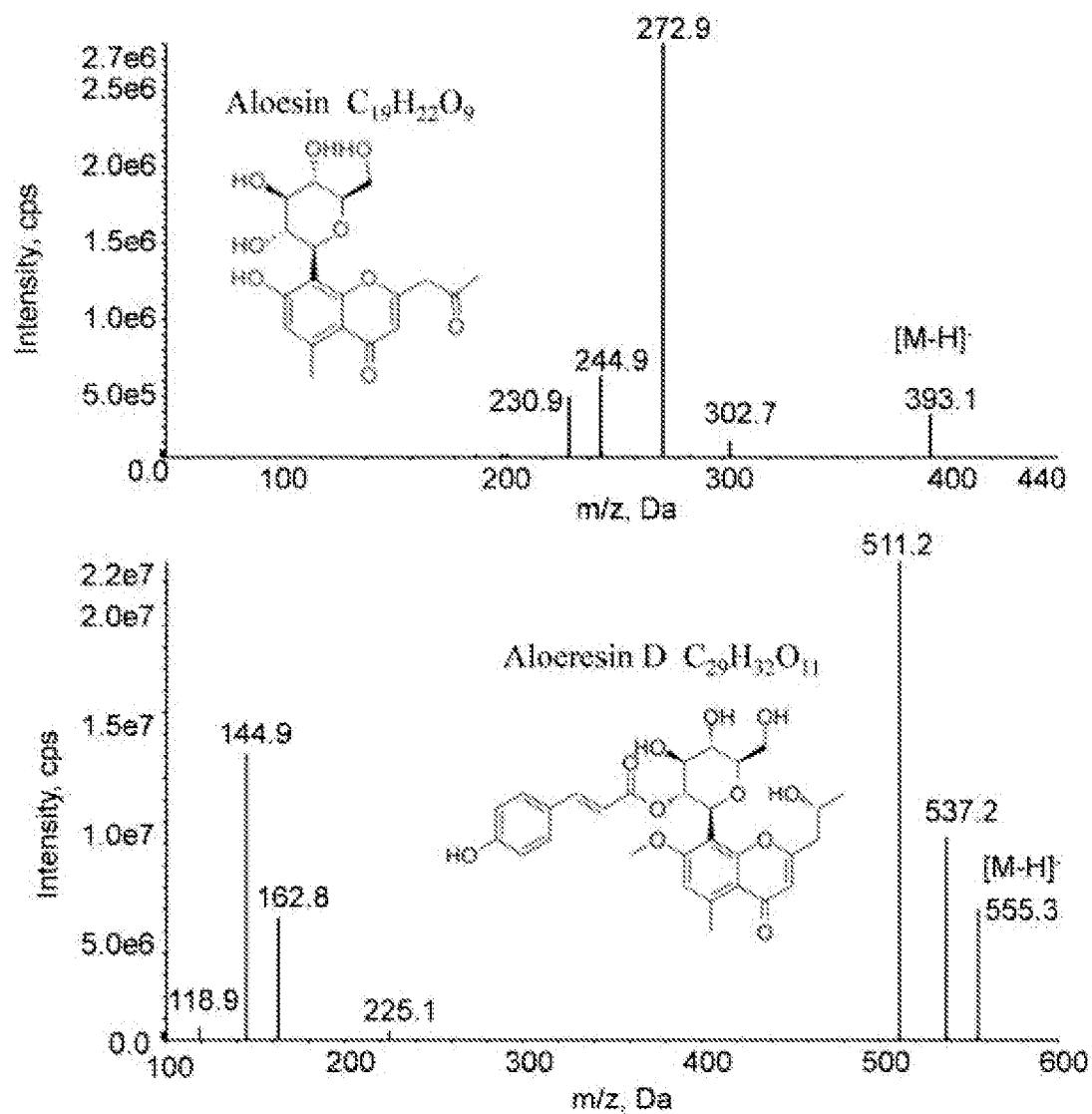
FIG. 1 shows the chemical structures and MS/MS spectrums of aloesin and aloeresin D.

In order to better understand the technical content of the present invention, specific embodiments are provided below to further illustrate the present invention.

Unless otherwise specified, the experimental methods used in the embodiments of the present invention are conventional methods.

The materials, reagents, etc. used in the embodiments of the present invention can be obtained from commercial sources unless otherwise specified.

Embodiment 1

1 Instruments, Reagents and Laboratory Animals 1.1 Instrument

The Nexera XR UHPLC liquid chromatograph (Shimadzu Corporation, Japan) being connected in series with an AB-SCIEX API 4000+ tandem quadrupole mass spectrometer through the Turbo V ion source interface, and the Analyst software controls data acquisition and processing (AB company in the United States). Model 5922 refrigerated centrifuge (KUBOTA, Japan), XS105DU one-hundredthousandth electronic analytical balance (Mettler-Toledo, Switzerland), LabTower ED115 ultrapure water integrated machine (Thermo Electron Corporation, USA), Vibrax circular oscillator (IKA, Germany)). AMS small animal anesthesia machine (Beijing Geneandi Technology Co., Ltd., Gene&I).

1.2 Reagents and Laboratory Animals

Aloesin standard substance is provided by Haorui Chemical (Shanghai) Co., Ltd. https://haoruichemical.com/); Aloeresin D (Aloeresin D) standard substance is provided by Chengdu Pufei De Biotech Co., Ltd. (http://preferred.bioon.com.cn/), batch number: 19072605. The purity of the standard substance is ≥98%. Chromatographic grade methanol is provided by Merck, Germany. Ultrapure water is prepared by LabTower EDI15 ultrapure water machine. Isoflurane is provided by Beijing Gene&I Technology Co., Ltd. (https://geneandi.cn.made-in-china.com/).

Clean-grade SD male rats, weighing 243~300 g (provided by Changsha Tianqin Biotechnology Co., Ltd. (http://www.lascn.com/), laboratory animal certificate number: No. 43006700017619, license number: SCXK (Hunan) 2014-0011); breeding conditions: temperature 22±2° C., humidity 40%~70%, alternating light and dark for 12 h, eating and drinking freely.

2 Methods and Results 2.1 Chromatography-Mass Spectrometry Conditions

Using Synergi Hydro-Rp (2.10 mm×50 mm, 4 μm, phenomenex) chromatographic column, column temperature 30° C., flow rate 0.50 mL·min$^{-1}$, injection volume 5 μL, and using a mobile phase A and a mobile phase B for gradient elution, wherein the mobile Phase A is an aqueous solution containing 0.1‰ (v/v) formic acid, the mobile phase B is methanol, and the gradient elution procedure is:

| Time/min  | mobile phase A/% | mobile phase B/% |
|-----------|------------------|------------------|
| 0~0.50    | 95               | 5                |
| 0.51~3.00 | 95~5             | 5~95             |
| 3.01~4.00 | 10               | 90               |
| 4.01~5.00 | 95               | 5                |

Using electrospray ion source (ESI), negative ion detection, spray voltage of 4500 volts, GS1 being 50 psi, GS2 being 50 psi, curtain gas being 30 psi, spray temperature being 550° C., collision gas being 2 psi.

Using multiple reaction ion monitoring (MRM), the ion pair used for the quantitative analysis of aloesin being m/z 393.1→272.9 (DP: −90, CE: −29, CXP: −10, EP: −10), of internal standard compound aloeresin D being 555.3→144.9 (DP: −115, CE: −41, CXP: −11, EP: −10).

The chemical structures and mass spectrums of aloesin and aloeresin D are shown in FIG. 1.

2.2 Solution Preparation

Accurately weighing an appropriate amount of aloesin standard substance and adding methanol to prepare a stock solution of 0.1 mg·m$^{-1}$. Taking an appropriate amount of aloeresin D standard substance, accurately weighing it, and adding methanol to prepare a 50 ng·mL$^{-1}$ internal standard solution. Storing the prepared solutions at 4° C. for later use.

2.3 Plasma Sample Processing

Taking 50 μL of plasma and placing it in a centrifuge tube, adding 150 μL of methanol solution containing internal standard compound aloeresin D 50 ng·mL$^{-1}$, swirling (vortex) at 2000 rpm for 10 min to fully precipitate the protein, centrifuging at 13,000 rpm (4° C.) for 10 min, taking the supernatant and placing a small amount in the sample tube, 5 μL being injected for LC-MS/MS analysis.

2.4 Methodological Investigation

According to the requirements of the guidelines for the verification of the fourth volume of the biological sample quantitative analysis methods in the 2020 edition of the Chinese Pharmacopoeia, the validity of the analysis method is verified.

2.4.1 Exclusive Investigation

Figure 2:
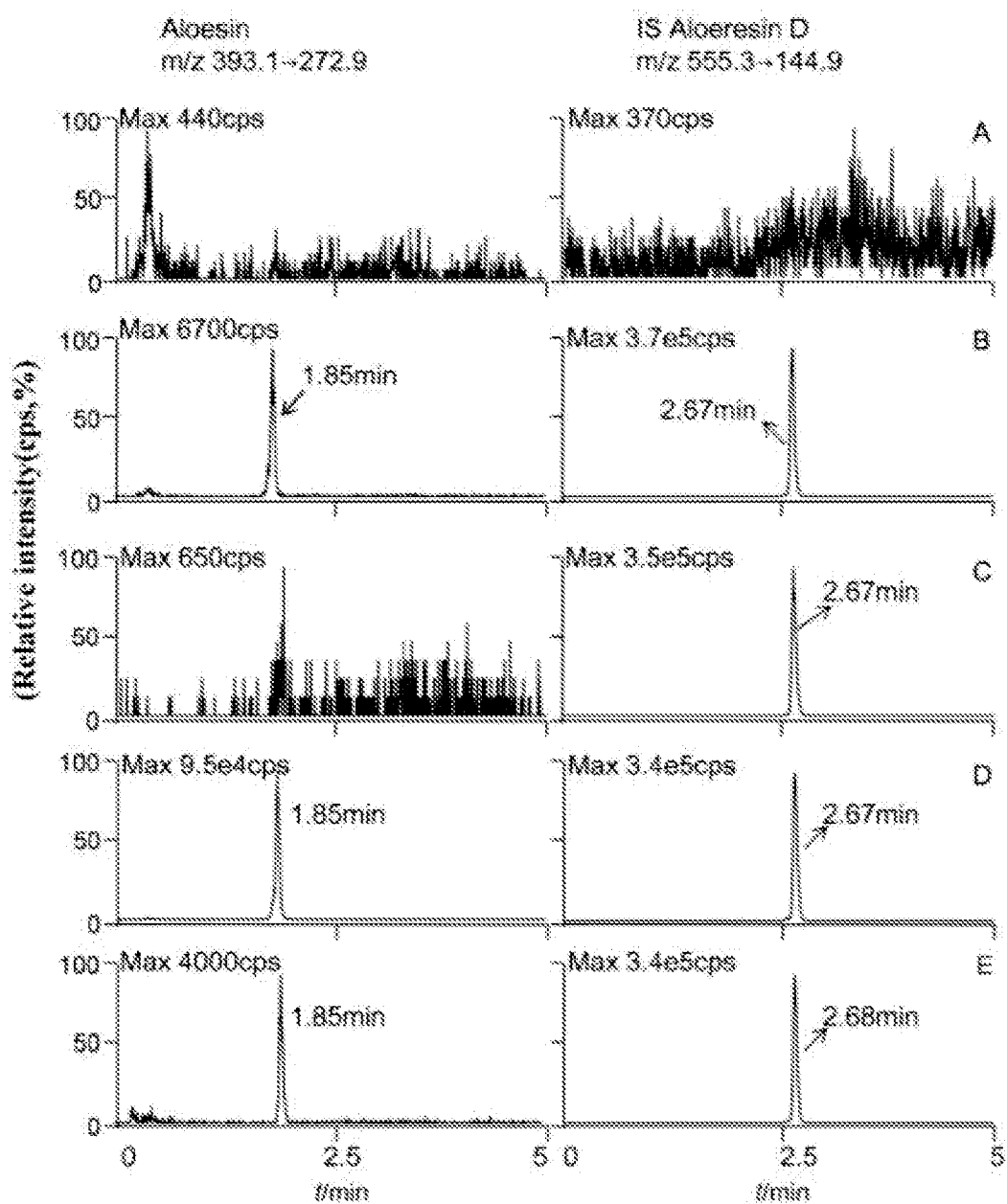
FIG. 2 shows the LC-MS/MS chromatograms of aloesin and internal standard compound aloeresin D, wherein there is a blank plasma sample (without internal standard processing, in plot A), there is a sample of the lower limit of quantification of the standard curve (aloesin 1 ng·mL$^{-1}$, in plot B), there is a blank plasma sample (with internal standard processing, in plot C); there is a plasma sample after 8 hours of oral administration (in plot D); there is a plasma sample after 8 hours of intravenous administration (in plot E).

Taking blank plasma samples from different rats, blank plasma samples added aloesin standard substance, plasma samples collected through the orbital vein after 8 hours of intravenous administration, and plasma samples collected after 8 hours of oral administration, treating the plasma samples according to the sample processing method under the above item "2.3", and according to the conditions of the above item "2.1", the samples being injected and analyzed, and the chromatogram being shown in FIG. 2. The peak times of aloesin and aloeresin D are 1.85 and 2.67 minutes, respectively.

2.4.2 Investigation of Linear Relationship

Take blank plasma, add 0.1 mg·mL$^{-1}$ of aloesin stock solution to prepare standard curve plasma samples with series concentrations of 600, 400, 200, 40, 10, 2, 1 ng·mL$^{-1}$, and take 50 μL of each plasma sample, and after treating them according to the method under the above item 2.3", 5 μL of each said sample is injected for analysis according to the method under the above item "2.1". Take the ratio of peak area of the to-be-detected substance to the internal standard (Y) as the ordinate, the concentration of the to-be-detected substance (X) as the abscissa, and the weight is 1/X$^2$, perform linear regression and get the regression equation Y=0.00617 X+0.00113 (r=0.9945). It shows that aloesin has a good linear relationship in the range of 1~600 ng·mL$^{-1}$.

2.4.3 Residual Effects

A sample with the upper limit of quantification of the standard curve (600 ng·mL$^{-1}$) is injected and analyzed, and then a blank sample is injected and analyzed, in order to investigate and analyze the residues of aloesin and aloeresin D in the chromatogram of the blank sample. As a result, the peak area of the residues of aloesin is less than 20% of the peak area of the sample with the lower limit of quantification, and the peak area of the residues of the internal standard compound aloeresin D is less than 5% of the peak area of the internal standard of the quality control sample, the residual effect meets the requirements.

2.4.4 Accuracy and Precision

Take blank plasma and add 0.1 mg·mL$^{-1}$ aloesin stock solution to prepare low, medium and high concentrations (3.0, 50.0, 500.0 ng·mL$^{-1}$) of aloesin quality control sample and sample of lower limit of quantification (1.0 ng·mL$^{-1}$), set 5 parallel samples for each concentration thereof, after processing them according to the method under the above item "2.3", inject and analyze them according to the method under the above item "2.1". Calculate the intra-day precision and accuracy, measure 3 batches of the samples within 3 days, and calculate the inter-day precision.

As a result, RSD (relative standard deviation) of both the intra-day precision and the inter-day precision is less than 15%, and the repeatability is good; the accuracy is between 96.96% and 107.28%. The specific results are shown in Table 1.

TABLE 1

Quantitative analysis precision and accuracy results of aloesin

| aloesin (ng·mL$^{-1}$) | intra-day precision(n = 5) | | | inter-day precision(n = 3) | | |
|---|---|---|---|---|---|---|
| | measurement value (ng/mL) | RSD (%) | accuracy (%) | measurement value (ng/mL) | RSD (%) | accuracy (%) |
| 1 | 0.93 ± 0.08 | 8.43 | 92.80 | 1.00 ± 0.11 | 10.88 | 101.67 |
| 3 | 2.91 ± 0.33 | 11.37 | 96.96 | 3.10 ± 0.27 | 8.57 | 103.59 |
| 50 | 52.32 ± 0.49 | 0.94 | 104.64 | 53.64 ± 1.81 | 3.37 | 107.28 |
| 500 | 489.60 ± 31.49 | 6.43 | 97.88 | 519.87 ± 30.51 | 8.31 | 100.56 |

2.4.5 Matrix Effect and Extraction Recovery Test

According to the method in the existing literature, the matrix effect is evaluated by the addition method after extraction, and the extraction recovery is investigated at the same time. Prepare aloesin samples with high, medium and low concentrations (500 ng·mL$^{-1}$, 50 ng·mL$^{-1}$, 3 ng·mL$^{-1}$) with three different solvents, and set 5 parallel samples for each concentration kind.

The solvent of the Set 1 series of sample is methanol;

The solvent of the Set 2 series of samples is the supernatant which comes from the blank plasma from different rats, wherein the supernatant is separated by centrifugation after the methanol is used to precipitate the protein of the blank plasma, wherein the volume of the methanol is 3 times volume of the blank plasma;

The solvent of the Set 3 series of sample is blank plasma from different rats.

Take 50 μL of each of the above samples, and process them according to the method under the above item "2.3", and analyze the samples according to the method under the above item "2.1". The peak areas are $A_1$, $A_2$, and $A_3$, and the matrix factor MF=$A_2$/$A_1$×100%; Extraction recovery RE=$A_3$/$A_2$×100%.

The ratio of the matrix factor of aloesin and the internal standard compound aloeresin D is the normalized matrix factor. The results are shown in Table 2.

TABLE 2

Matrix effect and extraction recovery of aloesin in rat plasma (Mean ± SD, n = 5), wherein SD is the abbreviation of standard deviation.

| concentration (ng · mL$^{-1}$) | matrix effect | | extraction recovery | |
|---|---|---|---|---|
| | Mean ± SD (%) | RSD (%) | Mean ± SD (%) | RSD(%) |
| 3 | 94.84 ± 2.57 | 2.71 | 75.03 ± 2.84 | 3.79 |
| 50 | 94.21 ± 2.65 | 2.81 | 72.24 ± 6.37 | 8.82 |
| 500 | 92.74 ± 4.33 | 4.66 | 69.04 ± 2.13 | 3.09 |

2.4.6 Stability Investigation

Prepare 3 concentrations of aloesin quality control samples (500 ng·mL$^{-1}$, 50 ng·mL$^{-1}$, 3 ng·mL$^{-1}$) with blank plasma, and examine the stability under the following conditions.

(1) After the sample is processed, it is placed in the autosampler for 8 hours, and then the sample is injected for analysis;

(2) The sample is processed after 3 freeze-thaw cycles, and the sample is injected for analysis;

(3) The sample is placed at room temperature for 4 hours and then comes out, and the sample is injected for analysis;

(4) The sample is processed after the sample is stored at −20° C. for 15 days, and then the sample is injected for analysis.

As a result, the test accuracy of each concentration sample is between 94.66% and 109.60%, and the RSD is less than 15%. The stability inspection is qualified. The results are shown in Table 3.

TABLE 3

Stability of aloesin in plasma samples

| Placement conditions | 3 ng · ml$^{-1}$ | | 50 ng · ml$^{-1}$ | | 500 ng · ml$^{-1}$ | |
|---|---|---|---|---|---|---|
| | RSD/% | Accuracy/% | RSD/% | Accuracy/% | RSD/% | Accuracy/% |
| Autosampler 8 h | 3.43 | 109.20 | 1.39 | 108.20 | 1.36 | 102.60 |
| 3 freeze-thaw cycles | 3.01 | 109.60 | 3.85 | 109.40 | 3.10 | 105.20 |
| room temperature for 4 hours | 4.48 | 106.18 | 3.98 | 105.20 | 0.78 | 101.80 |
| stored at −20° C. for 15 days | 4.76 | 108.00 | 6.50 | 100.14 | 4.56 | 94.66 |

Embodiment 2

The difference between this embodiment and the embodiment 1 is that the mobile phase A is 1.0‰ (v/v) formic acid aqueous solution. After testing, the results show that the peak shape of aloesin and aloeresin D is good, and there is no mutual interference, and the endogenous substances in the plasma have no obvious influence on the signal of aloesin and aloeresin D.

Embodiment 3

The difference between this embodiment and the embodiment 1 is that the concentration of the methanol solution containing the internal standard compound aloeresin D is 100 ng/mL. After testing, the results show that the peak height and peak area of aloeresin D increased by about 1 times, which can be used for effective quantification of aloesin.

Embodiment 4

The difference between this embodiment and the embodiment 1 is that the column temperature is 40° C. in the chromatographic conditions. After testing, the results show that the peak shape of aloesin and aloeresin D is good, and there is no mutual interference, and the endogenous substances in the plasma have no obvious influence on the signal of aloesin and aloeresin D.

Embodiment 5

The difference between this embodiment and the embodiment 1 is that in the chromatographic conditions, the sample injection volume is 10 μL. After testing, the results show that the peak shape of aloesin and aloeresin D is good, and there is no mutual interference, and the endogenous substances in the plasma have no obvious influence on the signal of aloesin and aloeresin D.

Embodiment 6

The difference between this embodiment and the embodiment 1 is that in the chromatographic conditions, the chromatographic column is Luna Omega C18 (2.10 mm×50 mm, 4 μm, phenomenex). After testing, the results show that the peak shape of aloesin and aloeresin D is good, and there is no mutual interference, and the endogenous substances in the plasma have no obvious influence on the signal of aloesin and aloeresin D.

Embodiment 7

The difference between this embodiment and the embodiment 1 is that in the chromatographic conditions, the chromatographic column is Kinetex Evo C18 (2.10 mm×50 mm, 4 μm, phenomenex). After testing, the results show that the peak shape of aloesin and aloeresin D is good, and there is no mutual interference, and the endogenous substances in the plasma have no obvious influence on the signal of aloesin and aloeresin D.

Embodiment 8

The difference between this embodiment and the embodiment 1 is that in the mass spectrometry conditions, GS1 (inner coaxial nebulizer $N_2$ gas) is 100 psi, GS2 (dry $N_2$ gas) is 100 psi, curtain gas is 50 psi, and collision gas is 8 psi. After testing, the results show that the peak heights of aloesin and aloeresin D are slightly reduced, and the signal-to-noise ratio (S/N) of the lowest quantification limit sample is ≥10.

Comparative Embodiment 1

The difference between this comparative embodiment and embodiment 1 is that in the step (2), the gradient elution procedure is:

| Time/min | mobile phase A/% | mobile phase B/% |
|---|---|---|
| 0~1.0 | 80 | 20 |
| 1.01~2.50 | 50 | 50 |
| 2.51~3.50 | 20 | 80 |
| 4.01~5.00 | 90 | 10 |

After testing, the results show that the retention time of aloesin is about 1 min, and there is a strong impurity peak interference signal near the peak position of the chromatographic peak, making the lower limit of quantification of aloesin in plasma to be unable reach 1 ng/mL.

Comparative Embodiment 2

The difference between this comparative embodiment and the embodiment 1 is that in the step (3), the mass spectrometry conditions are set as follows: electrospray ion source, negative ion detection, spray voltage of 5000V, spray temperature of 500° C.; adopting multiple reaction ion monitoring scan mode, the ion pair for the quantitative analysis of aloesin being m/z 393.1→272.9, and the ion pair of the internal standard compound aloeresin D being m/z 555.25→511.2. The results show that the signal intensity of aloesin and aloeresin D is 2 orders of magnitude lower than in the positive ion mode.

The above description is only the preferred embodiments of the present invention and is not intended to limit the present invention. Any modification, equivalent replacement, improvement, etc. made within the spirit and principle of the present invention shall be included in the scope of protection of the present invention.

The invention claimed is:

1. A LC-MS/MS method for measurement of aloesin in rat plasma, wherein it comprises:
   (1) plasma sample processing: taking the to-be-detected plasma containing aloesin, adding the methanol solution containing the internal standard compound aloeresin D thereinto, performing vortex precipitation, centrifuging, and collecting supernatant as to-be-detected sample;
   (2) setting the conditions of the liquid chromatogram as follows: carrying out gradient elution by adopting a mobile phase A and a mobile phase B, wherein the mobile phase A is an aqueous solution containing 0.1-1.0% (v/v) of formic acid, the mobile phase B is methanol, and the gradient elution procedure is as follows :

| Time/min | mobile phase A/% | mobile phase B/% |
|---|---|---|
| 0~0.50 | 95 | 5 |
| 0.51~3.00 | 95~5 | 5~95 |
| 3.01~4.00 | 10 | 90 |
| 4.01~5.00 | 95 | 5 |

0-0.50 (time/min), 95% mobile phase A and 5% mobile phase B; 0.51-3.00 (time/min), 95-5% mobile phase A and 5-95% mobile phase B; 3.01 - 4.00 (time/min), 10% mobile phase A and 90% mobile phase B; and 4.01-5.00 (time/min), 95% mobile phase A and 5% mobile phase B;
   (3) setting the mass spectrometry conditions as follows: using electrospray ion source, using negative ion detection, spray voltage being 4500V, spray temperature being 550° C.; adopting multiple reaction ion monitoring scan mode, wherein the ion pair used for the quantitative analysis of aloesin is m/z 393.1→272.9, and the ion pair for the internal standard compound aloeresin D is m/z 555.3→144.9.

2. The LC-MS/MS method for measurement of aloesin in rat plasma according to claim 1, wherein in the step (1) , the methanol solution containing internal standard compound aloeresin D is mixed with the plasma in a volume ratio of 2-4:1.

3. The LC-MS/MS method for measurement of aloesin in rat plasma according to claim 1, wherein, in the step (1), the concentration of the methanol solution containing the internal standard compound aloeresin D is 50 ng/mL~100 ng/mL.

4. The LC-MS/MS method for measurement of aloesin in rat plasma according to claim 1, wherein, in the step (1), the rotation speed of the vortex is 2000 rpm and the time thereof is 10 min; and the conditions of the centrifugation: with 13000 rpm and 4° C., centrifuging for 10 min.

5. The LC-MS/MS method for measurement of aloesin in rat plasma according to claim 1, wherein, in the step (2), a chromatographic column with a filler of C18 is used, and is chosen from one of the following: a Synergi Hydro-Rp C18 chromatographic column, a Luna Omega C18 chromatographic column, and a Kinetex Evo C18 chromatographic column; the specification of the chromatographic column being 2.10 mm×50 mm, and the particle size of the filler being 2-5 μm.

6. The LC-MS/MS method for measurement of aloesin in rat plasma according to claim 1, wherein the chromatographic conditions are as follows: column temperature being 28~40° C., injection volume being 1~10 μL, flow rate being 0.40~0.60 mL·min$^{-1}$.

7. The LC-MS/MS method for measurement of aloesin in rat plasma according to claim 1, wherein the mass spectrometry conditions are as follows: GS1 being 30-100 psi, GS2 being 30-100 psi, and curtain gas being 20-50 psi, collision gas being 1-8 psi.

8. The LC-MS / MS method for measurement of aloesin in rat plasma according to claim 1, wherein the parameters of the multiple reaction ion monitoring scan mode are:

|  | DP/V | CE/V | CXP/V | EP/V |
|---|---|---|---|---|
| aloesin | 90 | 29 | 10 | 10 |
| aloeresin D | 115 | 41 | 11 | 10 | aloesin: 90 DP/V, 29 CE/V, 10 CXP/V and 10 EP/V; and aloeresin D: 115 DP/V, 41 CE/V, 11 CXP/V and 10 EP/V.

9. The LC-MS/MS method for measurement of aloesin in rat plasma according to claim 6, wherein the column temperature is 30° C., the injection volume is 5 μL, and the flow rate is 0.50 mL·min$^{-1}$.

10. The LC-MS/MS method for measurement of aloesin in rat plasma according to claim 7, wherein the mass spectrometry conditions are as follows: GS1 being 50 psi, GS2 being 50 psi, curtain gas being 30 psi, collision gas being 2 psi.

* * * * *